(12) United States Patent
Chandrasekar et al.

(10) Patent No.: US 12,007,276 B2
(45) Date of Patent: Jun. 11, 2024

(54) SENSOR FOR HYPERSPECTRAL IMAGING BASED ON A METASURFACE-INTEGRATED LIGHT DETECTOR ARRAY

(71) Applicant: Purdue Research Foundation, West Lafayette, IN (US)

(72) Inventors: Rohith Chandrasekar, Princeton, NJ (US); Amr Shaltout, Palo Alto, CA (US); Vladimir Shalaev, West Lafayette, IN (US); Alexander Chubykin, West Lafayette, IN (US); Alexei Lagutchev, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/362,598

(22) Filed: Mar. 22, 2019

(65) Prior Publication Data
US 2020/0025610 A1   Jan. 23, 2020

Related U.S. Application Data

(60) Provisional application No. 62/646,879, filed on Mar. 22, 2018.

(51) Int. Cl.
*G01J 3/02*  (2006.01)
*G01J 3/28*  (2006.01)
(Continued)

(52) U.S. Cl.
CPC .......... *G01J 3/0237* (2013.01); *G01J 3/2803* (2013.01); *G01J 3/44* (2013.01); *G01N 21/19* (2013.01); *G01N 21/251* (2013.01)

(58) Field of Classification Search
CPC .......... G01J 3/0237; G01J 3/2803; G01J 3/44; G01J 3/0224; G01J 3/0208; G01J 3/2823;
(Continued)

(56) References Cited

U.S. PATENT DOCUMENTS 8,848,273 B2   9/2014 Yu et al.
10,760,970 B2  9/2020 Shaltout et al.
(Continued)

FOREIGN PATENT DOCUMENTS

EP   3133385 A1   2/2017
KR   101494326 B1  2/2015
(Continued)

OTHER PUBLICATIONS

Zhao, Y. et al., Recent Advances on Optical Metasurfaces, 2014, Journal of Optics, 16, 123001, 14 pages.
(Continued)

*Primary Examiner* — Stephone B Allen
*Assistant Examiner* — Jyotsna V Dabbi
(74) *Attorney, Agent, or Firm* — Purdue Research Foundation (57) ABSTRACT

A spectroscopic microscope device, including at least one array of metasurfaces, and at least one CCD array integrated with the array of metasurfaces. The metasurfaces in the array are configured to separately direct LCP an RCP components of light incident on the metasurface to separate pixels in the CCD array.

20 Claims, 6 Drawing Sheets (51) Int. Cl.
*G01J 3/44* (2006.01)
*G01N 21/19* (2006.01)
*G01N 21/25* (2006.01)

(58) Field of Classification Search
CPC .......... G01J 3/4412; G01J 3/02; G01J 3/0229; G01J 3/00; G01J 3/28; G01J 3/2806; G01J 3/2813; G01J 3/4406; G01J 3/447; G01J 2003/282; G01J 3/46; G01J 2003/2826; G01N 21/19; G01N 21/251; G01N 21/65; G01N 21/31; G01N 21/6458; G01N 21/6445; G01N 21/6417; G02B 27/56; G02B 21/361; G02B 21/22; G02B 21/0052; G02B 21/0064; G02B 21/0068; G02B 21/32; G02B 1/00; G02B 1/002; G02B 5/008; G02B 5/1871; G02B 5/201; G02B 5/204; G02B 2027/0114; H01Q 15/0086; H01Q 15/24; H01Q 21/00; H01Q 21/061; G02F 2202/30
USPC .......................................................... 359/376
See application file for complete search history.

(56) References Cited

U.S. PATENT DOCUMENTS

| | | |
|---|---|---|
| 2003/0218744 A1 | 11/2003 | Shalaev et al. |
| 2010/0232017 A1 | 9/2010 | McCarthy et al. |
| 2011/0235032 A1 | 9/2011 | Miller et al. |
| 2011/0261441 A1 | 10/2011 | Zheludev et al. |
| 2012/0268818 A1 | 10/2012 | Liu et al. |
| 2012/0280872 A1 | 11/2012 | Werner et al. |
| 2014/0085693 A1 | 3/2014 | Mosallaei et al. |
| 2015/0162658 A1 | 6/2015 | Bowers et al. |
| 2016/0025914 A1 | 1/2016 | Brongersma et al. |
| 2016/0259175 A1 | 9/2016 | Ellenbogen et al. |
| 2017/0003169 A1* | 1/2017 | Shaltout ................ G01J 3/0224 |
| 2017/0030773 A1* | 2/2017 | Han ...................... G01J 3/0205 |
| 2017/0146806 A1* | 5/2017 | Lin ...................... G02B 21/367 |
| 2017/0219739 A1 | 8/2017 | Lin et al. |
| 2017/0235162 A1 | 8/2017 | Shaltout et al. |
| 2017/0287151 A1* | 10/2017 | Han ........................ G06T 7/248 |
| 2017/0299784 A1 | 10/2017 | Mikkelsen et al. |
| 2017/0356843 A1 | 12/2017 | Alu et al. |
| 2018/0066991 A1 | 3/2018 | Mueller et al. |
| 2018/0074227 A1 | 3/2018 | Nomoto et al. |
| 2021/0190593 A1* | 6/2021 | Yao ........................ G02B 1/002 |

FOREIGN PATENT DOCUMENTS

| | | | |
|---|---|---|---|
| WO | 2008142723 A2 | 11/2008 | |
| WO | 2016000001 A1 | 1/2016 | |
| WO | 2016159880 A1 | 10/2016 | |
| WO | WO-2019126656 A2 * | 6/2019 | ............... G01J 4/04 |

OTHER PUBLICATIONS

Yin, X. et al., Photonic Spin Hall Effect at Metasurfaces, Mar. 22, 2013, Science, vol. 339, pp. 1405-1407.

Cao, T. et al., Extrinsic 2D Chirality: Giant Circular Conversion Dichroism from a Metal-Dielectric-Metal Square Array, Dec. 11, 2014, Scientific Reports, 4, 7442, pp. 1-7.

Chen, W. T. et al., Integrated Plasmonic Metasurfaces for Spectropolarimetry, Apr. 26, 2016, Nanotechnoogy 27, 2240002, 2016, 7 pages.

Shaltout, A. et al., Photonic Spin Hall Effect in Gap-Plasmon Metasurfaces for On-Chip Chiroptical Spectroscopy, Sep. 28, 2015, Optica, vol. 2, No. 10, pp. 860-863, 2015.

Li, Y. et al., Observation of Photonic Spin Hall Effect with Phase Singularity at Dielectric Metasurfaces, Optics Express, Jan. 23, 2015, vol. 23, No. 2, pp. 1767-1774, 2015.

Liu, Y. et al., Photonic Spin Hall Effect in Metasurfaces with Rotational Symmetry Breaking, arXiv: 1407.6088v2, [Physics. Optics], Aug. 4, 2014, 7 pages, 2014.

Shaltout, A. et al., Optically Active Metasurface with Non-Chiral Plasmonic Nanoantennas, Jul. 22, 2014, Nano Letters, 14, pp. 4426-4431, 2014.

* cited by examiner

SENSOR FOR HYPERSPECTRAL IMAGING BASED ON A METASURFACE-INTEGRATED LIGHT DETECTOR ARRAY

CROSS-REFERENCE TO RELATED APPLICATIONS

The present application claims the priority benefit of U.S. Provisional Patent Application Ser. No. 62/646,879, filed Mar. 22, 2018, the contents of which is hereby incorporated by reference in its entirety into this disclosure.

STATEMENT REGARDING GOVERNMENT FUNDING

This invention was made with government support under W911NF-13-1-0226 awarded by the Army Research Office, FA9550-14-1-0389 awarded by the Air Force Office of Scientific Research; and DMR-1120923 awarded by the National Science Foundation. The government has certain rights in the invention.

TECHNICAL FIELD

The present disclosure relates to hyperspectral imaging sensors, and more specifically, integration of metasurfaces with detector arrays to create a sensor providing hyperspectral imaging.

BACKGROUND

Adding a degree of spectroscopic resolution to existing imaging devices such as cameras, microscopes, and the like serves to greatly increase their capabilities by adding an extra dimension to intensity contrast. This is especially useful in biological microscopy, where the problems of improving contrast in a non-invasive manner is critical for characterizing the objects in vivo. Spectroscopically resolved imaging is also of vital importance in various fields, such as physics, chemistry, engineering, Earth remote sensing, medicine and pharmacology. Yet another step further is recording spectroscopically resolved images in various polarization domains. Again, biological applications stand to benefit the most from such capability, as the majority of biologically active substances are chiral and interact differently with light of particular handedness of circular polarization. Other applications can include but are not limited to colorimetry, absorption, emission and scattering spectroscopy, fluorescence spectroscopy, Raman spectroscopy, surveillance, etc. In every case it is necessary to spectrally resolve light reflected from or transmitted through the sample separately for different polarizations. This is typically achieved by sequential processing of analyzed light with wavelength-dispersive elements and polarization-specific elements. The elements of both types are typically bulky, which severely complicates the design of small form-factor spectroscopic devices with polarization sensitivity. Applying this approach to imaging devices is especially challenging. Regardless of the practical realization spectral imaging data adds a third spectroscopic dimension to two-dimensional image. The resulting 3-D data array is referred to as a data cube.

There exist several variations of imaging spectroscopy. The present disclosure is directed to snapshot hyperspectral imaging, which is characterized by the ability to simultaneously capture the light spectrum for every pixel of the detector. Recorded spectra are continuous over the specified wavelength range. This is in contrast with multispectral imaging, where the per-pixel spectral information is recorded in a form of several disjoined bands. Hyperspectral imaging has quickly found its way into various fields. Existing hyperspectral imaging systems typically use one of three techniques: (1) spatially-scanning slit spectrometer, (2) wavelength tuning a spectral filter, or (3) scanning the Fourier transform of the spectrum with a two-dimensional Fourier transform imager. However, these scanning-based methods are inherently limited since they cannot adequately image transient events due to the time needed to collect the full data-cube. Recently, several snapshot hyperspectral imaging systems have been developed which have the potential to overcome the limitations of scanning-based techniques by collecting the entire data-cube in a snapshot. These snapshot imaging systems use techniques such as aperture splitting, field sampling, computed tomography imaging spectroscopy and coded aperture snapshot spectral imaging. Of these techniques, only aperture splitting and field sampling have been demonstrated for real-time imaging, which is of paramount importance for in vivo imaging. However, they are still limited in terms of optical throughput, resolution and compactness of the sensor.

SUMMARY

The present disclosure provides a system and method to integrate an array of metasurfaces with a detector array to create a compact hyperspectral imaging sensor. The metasurface is designed of deeply subwavelength elements and acts to spatially separate spectral and circular polarization components directing them to different pixels of the underlying array. Using the disclosed method, real-time spectroscopically resolved images are achieved from sensors that are millimeters in dimension and extremely lightweight.

In one example embodiment, a Circular Dichroism (CD) spectral microscope is provided. Circular dichroism is the difference in absorption or reflection of left circularly polarized (LCP) and right circularly polarized (RCP) light. Circular Dichroism (CD) microscopy is a very important tool in imaging structures comprised of chiral molecules. Chiral molecules have spatial structure which makes them non-superposable with their own mirror image. Therefore, CD microscopes find many applications in areas including, but not limited to, biological sensing, stereochemistry, pharmacology, crystallography, DNA structural analysis, and live in vivo monitoring of processes in naturally behaving subjects. Furthermore many biological compounds undergo conformational changes in the body, and it is of significant interest to sense such changes in vitro and especially in vivo.

Currently, CD microscopes operate by feeding the signal detected by a microscope to a CD spectrometer, which measures LCP and RCP spectra sequentially. A photo-elastic modulator is used as a quarter-wave plate to generate LCP light across the wavelength range and measure the absorption, and then, the plate is switched to RCP and the process is repeated. This makes it impossible to capture live CD spectral images from naturally behaving subjects, as the measurements are very time-sensitive and must be mounted onto specimen. Due to its miniature dimensions and light weight, the presently disclosed sensor is especially valuable as a detector for miniature CD spectral microscopes suitable for implanting into lab animals for real-time monitoring.

A miniature real-time CD microscope sensor is provided which separates LCP and RCP spectra in space. An array of metasurfaces is integrated with a CCD array to capture real-time CD microscope images.

A Circular Dichroism CCD (CD-CCD) wavelength-dispersive array is assembled by introducing polymer on top of CCD array, and fabricating metasurface array on top of polymer. The whole CD-CCD array is sub-millimeter in all dimensions and can be integrated into currently available microscopes, as well as miniature microscopes for mounting lab specimens.

Separation of LCP and RCP spectra is achieved in either transmission or reflection mode. For transmission mode, dielectric metasurface is used, while for reflection mode, metallic metasurface is used.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION

Figure 1:
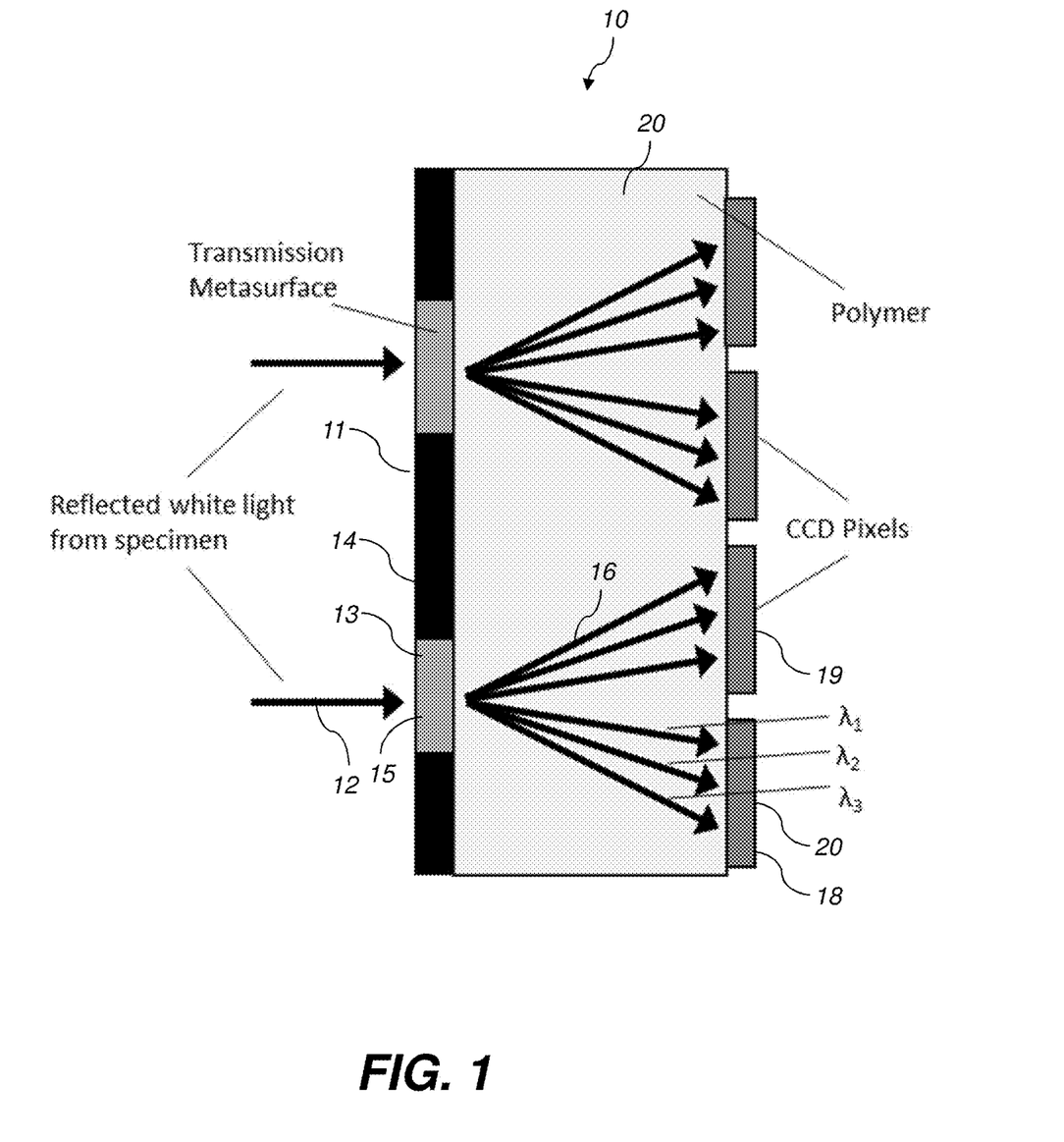
FIG. 1 shows a diagram of a Circular Dichroism CCD (CD-CCD) array according to one embodiment, using transmissive metasurface arrays.

The presently disclosed CD CCD array may be submillimeter in dimensions. FIG. 1 shows a diagram of a Circular Dichroism CCD (CD-CCD) array 10 according to one embodiment, using transmissive metasurface arrays 15. A layer of metal 11 is deposited on top of the structures and holes 13 (which are in the range of 100-400 μm wide) are exposed to ensure light reflected from a specimen passes through the metasurface 14. Each pixel 18 of the CCD array is in the range of 0.5-1 mm in width (although they could also 0.25-1.5 mm in width) and two such pixels 18 and 19 are aligned with a metasurface array. One pixel 19 collects the Left circularly polarized (LCP) light, while the other pixel 20 collects Right circularly polarized (RCP) light, allowing for simultaneous collection. The size of the metasurface array and the thickness of the polymer layer is dictated by the angle spread of the wavelengths, to ensure all signals are captured by the CCD array.

The array 10 can be attached to any standard microscope to capture real-time CD microscopy images. Incident light beams 12 are reflected from a sample of interest, which is normally incident on the transmission metasurface 15. The LCP and RCP components are then scattered as shown (beams 16), with different wavelengths scattered in different angles, and thereby spatially separating LCP and RCP components of different wavelengths. With this metasurface, LCP and RCP components can be detected by different pixels 18 on the CCD array, allowing for simultaneous measurement and fast construction of CD images.

The LCP and RCP components are scattered by the metasurface such that they can be detected by separate CCD pixels (e.g., pixels 18 and 19). The distance between the metasurface 15 and the CCD array is dictated by the CCD pixel size and the spatial spread of wavelengths. In order to have all wavelengths of both LCP and RCP fully collected by 2 adjacent CCD pixels 18 and 19, the distance between the metasurface and CCD array should be on order of a few micrometers. This is achieved by spin-coating a transparent dielectric polymer 20 on top of the CCD array and fabricating the metasurface on top of this polymer layer 20.

Figure 3A:
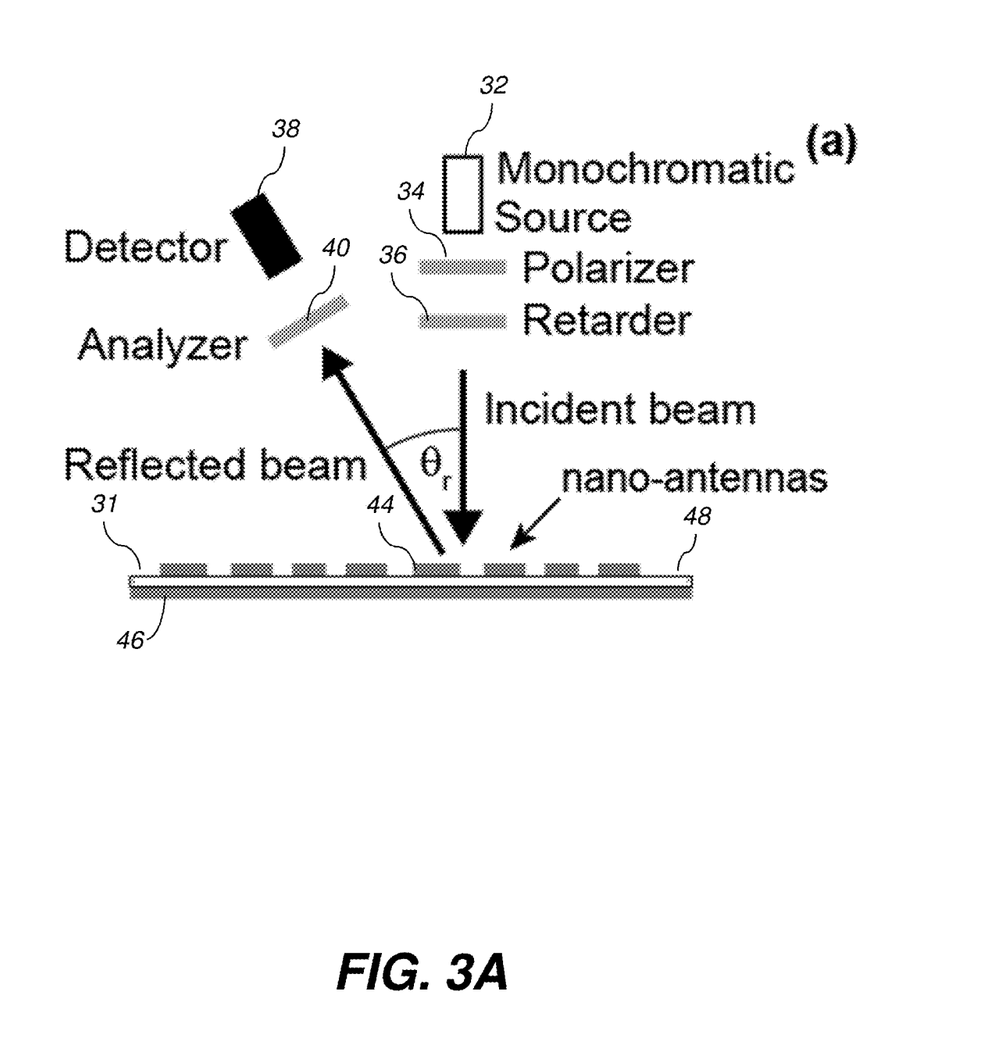
FIG. 3A shows a schematic of an optical arrangement used to confirm that the metasurface scatters different wavelengths of different polarizations at different angles according to one embodiment.
Figure 3B:
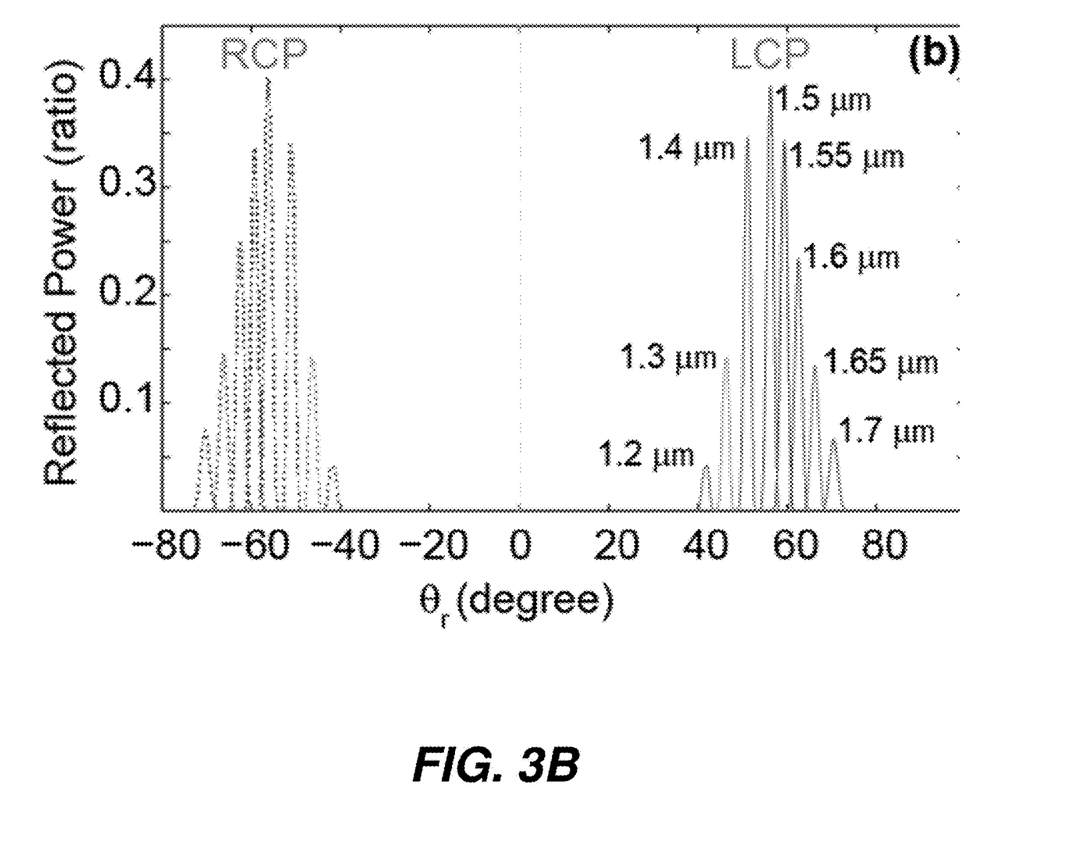
FIG. 3B shows the spectrum of collected light for LCP and RCP incident beams as a function of scattering angle.

For the device of FIG. 1, the metasurface functions in transmission. FIG. 3A shows a schematic of an optical arrangement 30 used to confirm that the metasurface 31 scatters different wavelengths of different polarizations at different angles according to one embodiment. A tunable monochromatic source 32, a polarizer 34 and a retarder 36 are provided as shown to generate circularly polarized light for different wavelengths. Scattered light is collected as a function of scattering angle using a detector 38 and analyzer 40 on a rotating arm, for example. FIG. 3B shows the associated spectrum of collected light for LCP and RCP incident beams as a function of scattering angle.

The metasurface of FIG. 3A can be configured for transmission by changing the materials used, depending on the needs of the application. The structure comprises a repeating pattern (e.g., a period of 4 structures in the illustrated example shown in FIG. 2). Within each period, the major axes of the antennas are oriented at different angles, to span a full 180 degree orientation. In one embodiment, the antennas are oriented at 0°, 45°, 90° and 135°. The structure in FIG. 3A includes a back reflecting metal layer 46 covered by a dielectric spacer layer 48. On top is the metasurface structure comprising metallic nano-antennas 44. For the transmission metasurface, there will be no back reflecting plate 46. The metallic nanoantennas 44 will have a sandwich structure with bottom metal layer, dielectric spacer layer, and top metal layer. This structure may be fabricated using electron beam lithography or photolithography using standard photoresists. After the pattern is made, metal and dielectric layers can be deposited, followed by lift-off to leave sandwich-structure nanoantennas. The metal layers may be formed using any metal (gold, silver, copper, aluminum, titanium nitride, zirconium nitride . . . etc.). The thickness of the bottom and top metal layers can vary from tens to hundreds of nanometers, and can be deposited using chemical vapor deposition (CVD) and physical vapor deposition (PVD) techniques. The dielectric spacer layer 48 is in the range of a few tens of nanometers in thickness and can also be deposited using any of the chemical vapor deposition (CVD) and physical vapor deposition (PVD) techniques.

Figure 2:
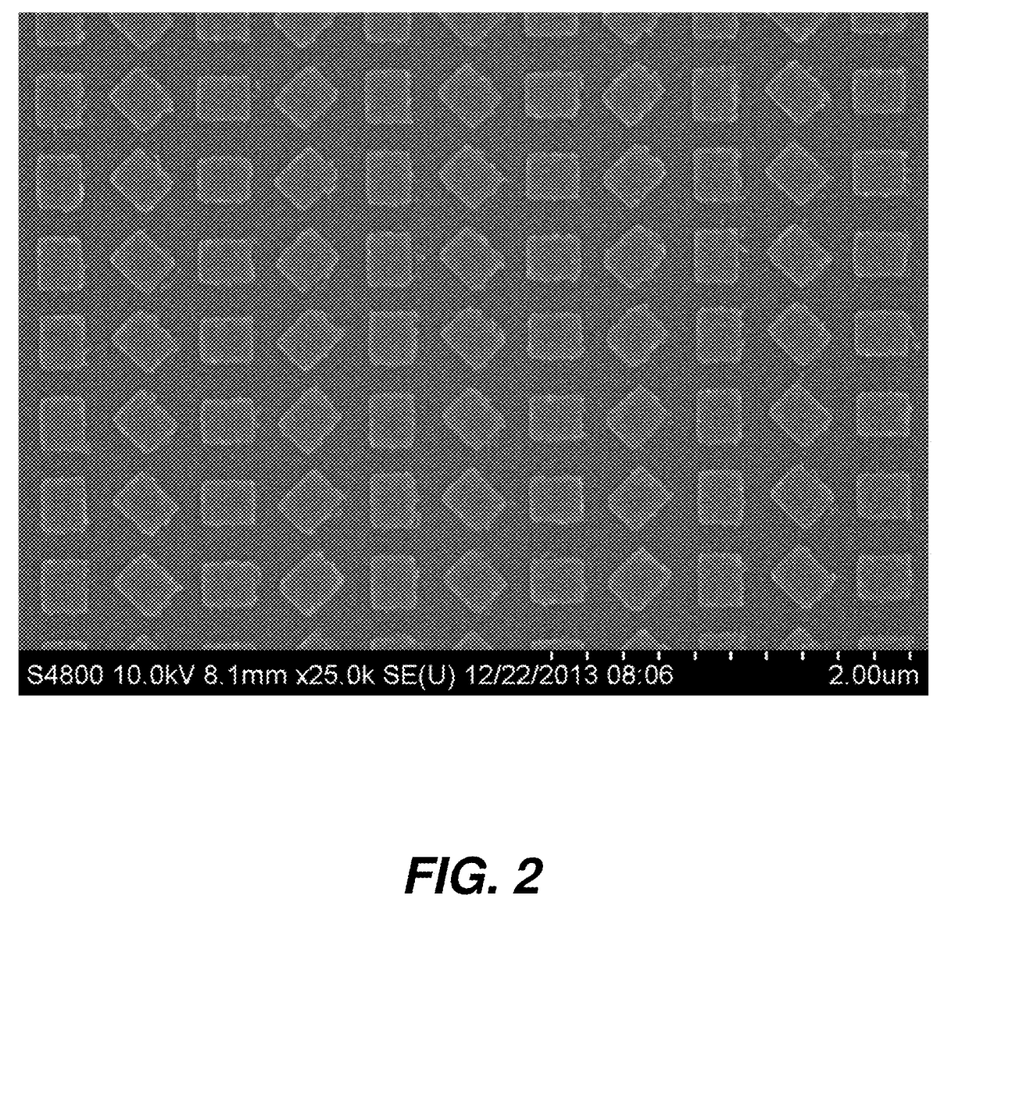
FIG. 2 shows an image of a fabricated reflective Circular Dichroism metasurface, imaged using field emission scanning electron microscope (FE SEM) according to one embodiment.

As an example, a reflecting metasurface, shown in FIG. 2 was fabricated with a bottom gold layer 50 nm thick, covered by a 50 nm alumina spacer layer. The top most layer was an array of 30 nm thick rectangular gold antennas. The antennas were 230 nm×280 nm, with a separation of 450 nm. The materials were deposited using electron beam evaporation, and the antenna array was patterned using electron beam lithography.

The fabricated metasurface functions in the near-infrared region, and was tested using the optical arrangement as shown in FIG. 3A. The setup consists of a monochromatic source, a polarizer and a retarder to generate circularly polarized light for different wavelengths. The light is incident on the metasurface at normal incidence. The light scattered from the metasurface is collected using a detector mounted on a rotating arm, which allows for collection as a function of reflected angle. FIG. 3B shows that the LCP light is reflected to the right, while the RCP light is reflected to the left. Also, different wavelengths between 1.2 μm and 1.7 μm are scatted at different angles, ranging from 40° to 70°. As shown, the metasurface efficiently spatially separates LCP and RCP light of different wavelengths.

The incident light beam need not be generated from a laser source. Any non-coherent lamp source, or light-emitting diode (LED) or Xenon lamp with equal components of LCP and RCP can be used with the presently disclosed device.

In order to have proper collection of LCP and RCP components of light using the CCD array, the metasurface patterns should be properly located with respect to the CCD pixels. To do this, the CCD array will be used as a substrate for fabrication and metasurfaces will be aligned with pixel array. First, a polymer layer is spin coated on top of the CCD array. The thickness of this layer depends on CCD pixel size. The thicker the polymer layer, the larger the separation between different wavelengths at the CCD array. So the polymer layer must be thick enough to achieve sufficient spatial separation, but thin enough to ensure all wavelengths are collected by single CCD pixel. Then a thick (hundreds of nanometers) metal layer will be deposited. A layer photo resist will be spin coated on top of CCD array. Photolithography or electron beam lithography will be used to expose patches for metasurface arrays. Arrays will be situated on top of the polymer layer at the center of two adjacent CCD pixels, as seen in FIG. 1. Exposed metal will be etched using reactive ion etching. This is to ensure that all light collected by CCD array passes through the metasurface arrays. A second layer of photo resist will be spin coated on top of remaining metal. Photolithography or electron beam lithography is used to pattern the metasurface arrays. Metal and dielectric layers will be deposited for metasurface array, followed by lift off.

Figure 4:
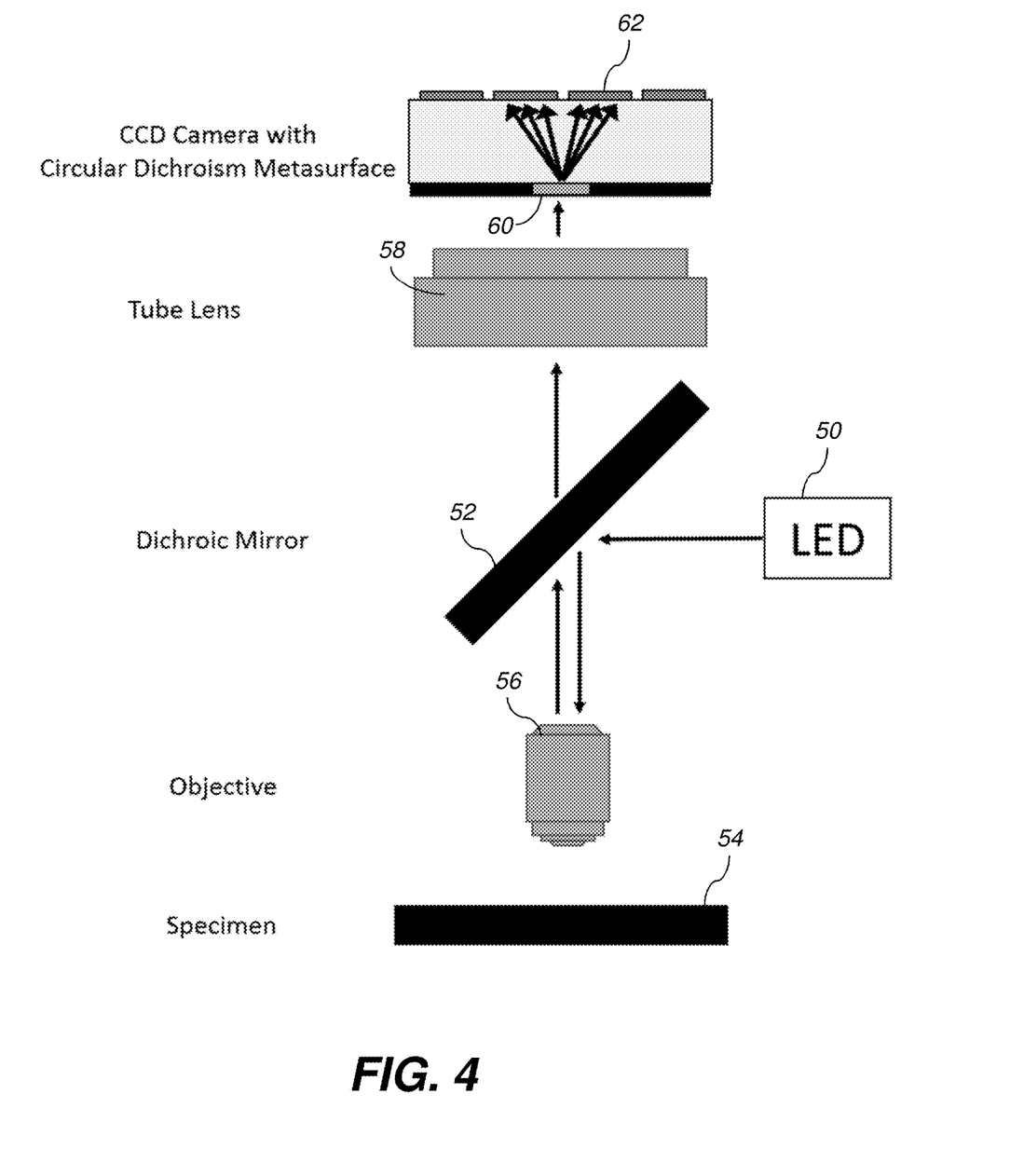
FIG. 4 shows a basic schematic of a microscope with a CCD camera with Circular Dischroism metasurface according to one embodiment.

After integrating the metasurface with the CCD array, the array can be built into a standard microscope setup as shown in FIG. 4. An LED, or other non-coherent light source 50, is provided to generate non-coherent white light. A dichroic mirror 52 reflects the light down to the specimen 54 through an objective 56. The reflected light is taken up through a tube lens 58, focusing the light onto the individual metasurfaces 60. The metasurface then spatially separates LCP and RCP light of different wavelengths onto the CCD camera pixels 62.

Figure 5:
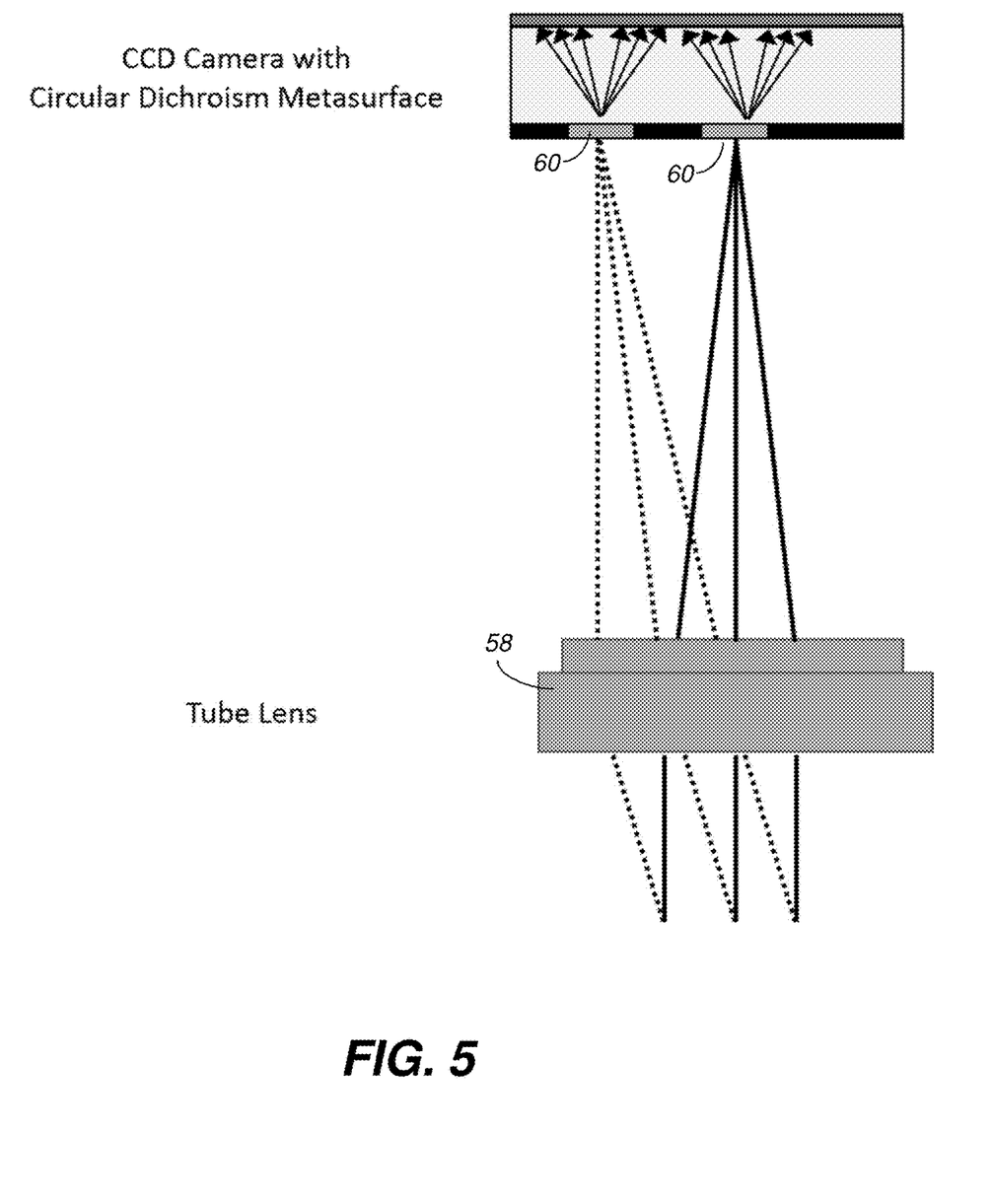
FIG. 5 shows the tube lens focusing on-axis and off-axis light components onto separate metasurfaces within the metasurface array according to one embodiment.

As discussed above, a non-coherent light source 50 generates white light that is focused onto the specimen 54 using an objective 56. The reflected light is sent back up the microscope column and is focused by a tube lens 58 onto the circular dichroism metasurface array. To ensure that the reflected light impinges on the metasurface with minimal divergence angle, the metasurface should be within one Rayleigh length away from the focus of the tube lens. The tube lens 56 focuses light from on-axis and off-axis rays onto different areas of the metasurface array, and the CCD array, as shown in FIG. 5. Each individual metasurface 60 in the array may have dimensions varying from 10 um to 1 mm, depending on the required spatial resolution. For example, with a tube lens with 200 mm focal length and with 20 mm aperture diameter, the divergence angle at the focus will be only 0.12 radians, or 0.0021°, with a Rayleigh length of 280 um and waist size of 7 um at the focus. The distance between the metasurface array and CCD array can vary between 50 um and 1 mm depending on the size of the metasurface arrays. For the metasurface provided as an example here which separates wavelengths 1.2-1.7 um over a range of 40°-70°, a distance of 55 um is needed between the metasurface array and CCD array to ensure that all spectral components are separate spatially to be collected by individual CCD pixels. This distance of 55 um is within the Rayleigh length for a 200 mm tube lens, ensuring that the beam divergence angle is quite small, and so all spectral components can be collected without any distortions.

FIG. 5 shows the tube lens 58 focusing on-axis and off-axis light components onto separate metasurfaces 60 within the metasurface array. Each metasurface then spatially separates the LCP and RCP components as shown, which are collected by the CCD array.

What is claimed is:

1. A spectroscopic device, comprising:
    a. a unitary surface having an array of transmissive metasurfaces configured to interact with an incident light reflected from a specimen, wherein each transmissive metasurface of the array of transmissive metasurfaces is positioned to interact with a different respective portion of the incident light; and
    b. a CCD array including a plurality of pixels integrated with the array of transmissive metasurfaces such that each transmissive metasurface is associated with a unique pair of pixels of the plurality of pixels, thereby forming a plurality of unique pairs of pixels,
    wherein each transmissive metasurface is configured to direct Left circularly polarized (LCP) components of the respective portion of the incident light on the transmissive metasurface to a first pixel of the unique pair of pixels and Right circularly polarized (RCP) components of the respective portion of the incident light on the transmissive metasurface to a second pixel of the unique pair of pixels,
    wherein the plurality of unique pairs of pixels collectively form a spectroscopically resolved image of the specimen.

2. The spectroscopic device of claim 1, wherein the array of transmissive metasurfaces is sub-millimeter in thickness.

3. The spectroscopic device of claim 1, wherein the spectroscopically resolved image includes a colorimetric image.

4. The spectroscopic device of claim 1, wherein the spectroscopically resolved image includes a Raman spectroscopic image.

5. The spectroscopic device of claim 1, wherein the spectroscopically resolved image includes a Circular Dichroic (CD) image.

6. The spectroscopic device according to claim 1, wherein the array of transmissive metasurfaces is fabricated on top of the CCD array.

7. The spectroscopic device according to claim 1, wherein the array of transmissive metasurfaces is adjustable to work within a plurality of wavelengths including ultraviolet, visible, and infrared.

8. The spectroscopic device according to claim 1, wherein the array of transmissive metasurfaces and the CCD array are each configured to couple with a microscope, wherein the array of transmissive metasurfaces and the CCD array are configured generate spectroscopically resolved images from samples observed by the microscope.

9. The spectroscopic device according to claim 1, wherein the array of transmissive metasurfaces and the CCD array are each configured to couple adjacent to or within a body, wherein the array of transmissive metasurfaces and the CCD array are configured to perform biological sensing in vitro or in vivo relative to the body.

10. The spectroscopic device according to claim 1, wherein the spectroscopic device is configured to perform DNA structural analysis.

11. The spectroscopic device according to claim 1, wherein the spectroscopic device is configured to perform stereochemical applications.

12. The spectroscopic device according to claim 1, wherein the spectroscopic device is configured to perform crystallography.

13. The spectroscopic device according to claim 1, wherein the spectroscopic device is configured to perform live monitoring of biological molecules in naturally behaving subjects.

14. The spectroscopic device of claim 1, wherein the plurality of unique pairs of pixels simultaneously capture spectral data from the incident light reflected from the specimen to form a snapshot hyperspectral image of the specimen.

15. The spectroscopic device of claim 1, wherein the unitary surface includes an outer metallic layer, wherein the outer metallic layer includes a plurality of voids, wherein each void of the plurality of voids exposes one transmissive metasurface of the array of transmissive metasurfaces.

16. The spectroscopic device of claim 15, wherein each void of the plurality of voids extends from 100 to 400 micrometers wide.

17. A spectroscopic device, comprising:
a. a unitary surface having an array of transmissive metasurfaces configured to interact with an incident light reflected from a specimen, wherein each transmissive metasurface of the array of transmissive metasurfaces includes a plurality of nanoantennas, wherein each nanoantenna is formed having a top metallic layer, a central dielectric layer, and a bottom metallic layer;
b. a dielectric disposed adjacent to the array of transmissive metasurfaces; and
c. a CCD array disposed adjacent to the dielectric, wherein the dielectric is positioned in between the array of transmissive metasurfaces and the CCD array, wherein the CCD array includes a first pixel and a second pixel spatially separate from the first pixel for each transmissive metasurface of the array of transmissive metasurfaces thereby forming a plurality of first pixels and a plurality of second pixels;

wherein each transmissive metasurface is configured to direct Left circularly polarized (LCP) components of incident light on the transmissive metasurface to the respective first pixel and Right circularly polarized (RCP) components of incident light on the transmissive metasurface to the respective second pixel, wherein the plurality of first pixels and the plurality of second pixels capture an entire light spectrum reflected from the specimen to form a spectroscopically resolved image.

18. A spectroscopic sensor, comprising:
a. a unitary surface having an array of transmissive metasurfaces configured to interact with an incident light reflected from a specimen, wherein each transmissive metasurface of the array of transmissive metasurfaces extends from 10 micrometers to 1 millimeter wide and is positioned to interact with a respective portion of the incident light; and
b. a CCD array including a plurality of pixels, wherein each pixel of the plurality of pixels extends from 0.5 millimeters wide to 1 millimeter wide, wherein each transmissive metasurface of the array of transmissive metasurfaces is associated with a unique pair of pixels from the plurality of pixels, wherein each transmissive metasurface is configured to direct Left circularly polarized (LCP) components of the respective portion of the incident light to a first pixel of the unique pair of pixels and Right circularly polarized (RCP) components of the respective portion of the incident light to a second pixel of the unique pair of pixels, whereby a first spectral dataset is generated from all LCP components of the incident light and a second spectral dataset is generated from all RCP components of the incident light, wherein the first and second spectra datasets collectively form a spectroscopically resolved image.

19. The spectroscopic sensor according to claim 18, wherein the array of transmissive metasurfaces is fabricated on top of the CCD array.

20. The spectroscopic sensor according to claim 18, wherein the array of transmissive metasurfaces and the CCD array are each configured to couple with a microscope, wherein the array of transmissive metasurfaces and the CCD array are configured generate the spectroscopically resolved image from a sample observed by the microscope.

* * * * *